United States Patent
Gattineri

(10) Patent No.: US 9,474,411 B2
(45) Date of Patent: Oct. 25, 2016

(54) BAKING PAN ASSEMBLY

(75) Inventor: Mary Gattineri, Winchester, MA (US)

(73) Assignee: Magical Housewares LLC, Winchester, MA (US)

( * ) Notice: Subject to any disclaimer, the term of this patent is extended or adjusted under 35 U.S.C. 154(b) by 0 days.

(21) Appl. No.: 13/549,320

(22) Filed: Jul. 13, 2012

(65) Prior Publication Data

US 2014/0017371 A1    Jan. 16, 2014

(51) Int. Cl.
*A47J 37/01* (2006.01)
*A21B 3/13* (2006.01)

(52) U.S. Cl.
CPC ............... *A47J 37/01* (2013.01); *A21B 3/132* (2013.01)

(58) Field of Classification Search
CPC .......... A21C 5/02; A21C 11/10; A23C 5/04; B65D 1/36; B65D 25/04; B65D 25/06; B65D 25/02; B65D 11/1833; B65D 2519/00502; B65D 2519/00293; B65D 5/48024; A21B 3/18; A21B 3/13; A21B 3/131; A21B 3/15; A47J 37/01
USPC ....... 426/517, 518, 389, 512, 496, 478, 468, 426/421, 523; 99/427, 449; 220/573.1, 529, 220/531, 573.4, 573.5
See application file for complete search history.

(56) References Cited

U.S. PATENT DOCUMENTS

| | | | | |
|---|---|---|---|---|
| 987,525 A * | 3/1911 | Wing | | 99/439 |
| 2,101,487 A * | 12/1937 | Anderson | | 211/74 |
| 2,411,857 A * | 12/1946 | Harriss | | 426/302 |
| 2,543,682 A * | 2/1951 | Warfel | | 425/403 |
| 2,952,225 A * | 9/1960 | Ellison | | 101/4 |
| 3,182,585 A | 5/1965 | Rensch et al. | | |
| 3,241,545 A * | 3/1966 | Reinert et al. | | 126/19 R |
| 4,167,233 A | 9/1979 | Hare | | |
| 4,884,499 A | 12/1989 | Rensch et al. | | |
| 7,770,751 B2 * | 8/2010 | Henry et al. | | 220/529 |
| 2009/0302042 A1 | 12/2009 | Henry et al. | | |

OTHER PUBLICATIONS

Photo of Sunbeam Patio Master portable gas grill with pivoting stand, circa 1998.

* cited by examiner

*Primary Examiner* — Rena L Dye
*Assistant Examiner* — Lela S Williams
(74) *Attorney, Agent, or Firm* — Douglas Denninger

(57) ABSTRACT

A baking pan assembly including a frame with at least three contiguous walls defining an upper opening and a lower opening, and having a lip at least partially bordering the lower opening. The assembly further includes at least one removable sheet sized to block the lower opening of the frame, and at least one divider array sized to rest on the sheet within the frame. The array defines a plurality of compartments to receive goods to be baked.

11 Claims, 7 Drawing Sheets

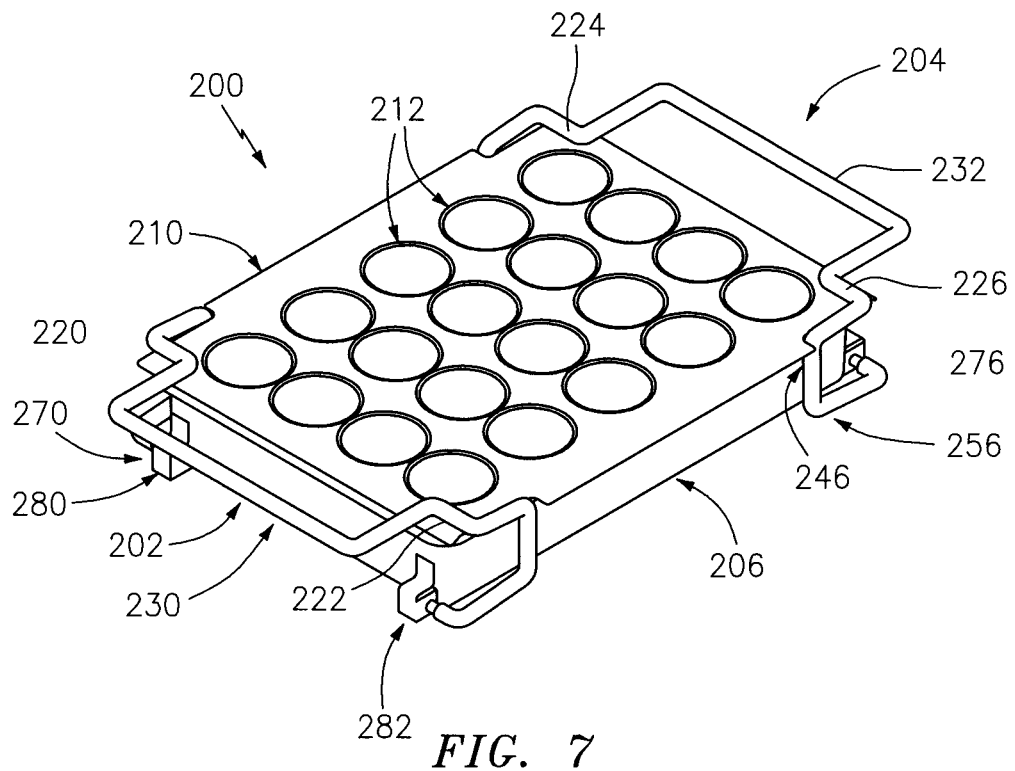
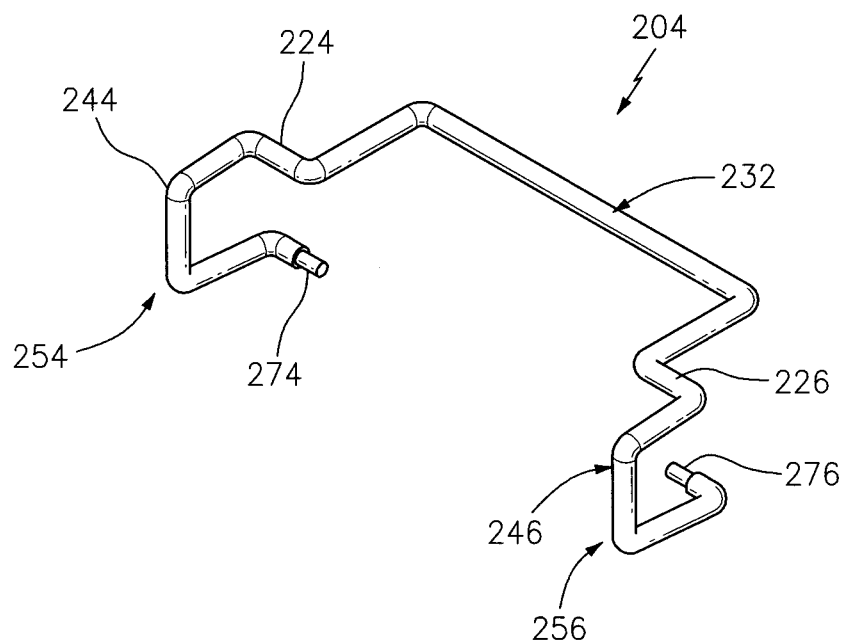

BAKING PAN ASSEMBLY

CROSS-REFERENCE TO RELATED APPLICATION

None.

FIELD OF THE INVENTION

This invention relates to devices for making baked goods and more particularly to baking pans having multiple components.

BACKGROUND OF THE INVENTION

Various types of baking pans are used by individuals and companies to bake goods such as cookies, brownies, cakes, pies, dessert bars, bread loaves, lasagne and appetizers. However, it is often difficult to remove the goods from the pan or tray once baked without losing the aesthetic appearance of the goods.

It is therefore desirable to have a baking pan system that can bake well-shaped baked goods. A further need exists for such a baking pan to include techniques for easily removing the baked goods from the pan.

SUMMARY OF THE INVENTION

An object of the present invention is to provide a baking pan assembly which reliably forms goods into one or more desired shapes.

Another object of the present invention is to provide such an assembly which facilitates easy removal of the baked goods.

A still further object is to provide a baking pan assembly which is readily cleaned.

This invention features a baking pan assembly including a frame with at least three contiguous walls defining an upper opening and a lower opening, and having a lip at least partially bordering the lower opening. The assembly further includes at least one removable sheet sized to block the lower opening of the frame, and at least one divider array sized to rest on the sheet within the frame. The array defines a plurality of compartments to receive goods to be baked.

In some embodiments, the frame has at least four contiguous walls, and the divider array includes at least one edge having a lower surface that projects beyond the frame. The lip of the frame completely borders the lower opening to fully support the sheet, which may further include a lifter element.

In certain embodiments, at least one handle is pivotally connected to the frame, and the divider array includes at least one edge having a lower surface that projects beyond the frame. The handle includes at least one fulcrum surface to engage a portion of the lower surface of the edge of the divider when the handle is partially rotated, and preferably includes at least one stand surface upon which the handle rests when the handle is further rotated beneath the frame. One or more tamps are provided in some embodiments, each tamp sized to match the cross-sectional area of at least one compartment to press upon material in that compartment.

This invention also features a method of baking goods by selecting a baking pan assembly including a frame with at least four contiguous walls defining an upper opening and a lower opening, and having a lip substantially bordering the lower opening. The method includes placing at least one removable sheet, sized to block the lower opening of the frame, into the frame to form a baking pan, and selecting at least one divider array sized to rest on the sheet within the frame, the array defining a plurality of compartments to receive goods to be baked. At least one divider array is placed onto the sheet within the frame. Material to be baked is added into at least one of the compartments, and the assembly is heated to bake the goods.

In some embodiments, the frame includes at least two handles pivotally connected to opposing sides of the frame, and the method further includes rotating the handles to at least partially separate the divider from the sheet. Each handle further includes at least one stand surface upon which the handle rests when the handle is rotated beneath the frame. Preferably, at least one wall of each compartment is substantially vertical to facilitate separation from a good baked in that compartment when the divider array is lifted away from the sheet when the handles are rotated.

BRIEF DESCRIPTION OF THE DRAWINGS

In what follows, preferred embodiments of the invention are explained in more detail with reference to the drawings, in which:

FIG. 7 is a view of the assembly of FIG. 6 prior to receiving material to be baked;

FIG. 8 is an enlarged view of the handle shown in FIGS. 6 and 7;

DETAILED DESCRIPTION OF THE PRESENTLY PREFERRED EMBODIMENTS

This invention may be accomplished by a baking pan assembly including a frame with at least three contiguous walls defining an upper opening and a lower opening, and having a lip at least partially bordering the lower opening. The assembly further includes at least one removable sheet sized to block the lower opening of the frame, and at least one divider array sized to rest on the sheet within the frame. The array defines a plurality of compartments to receive goods to be baked.

Figure 1:
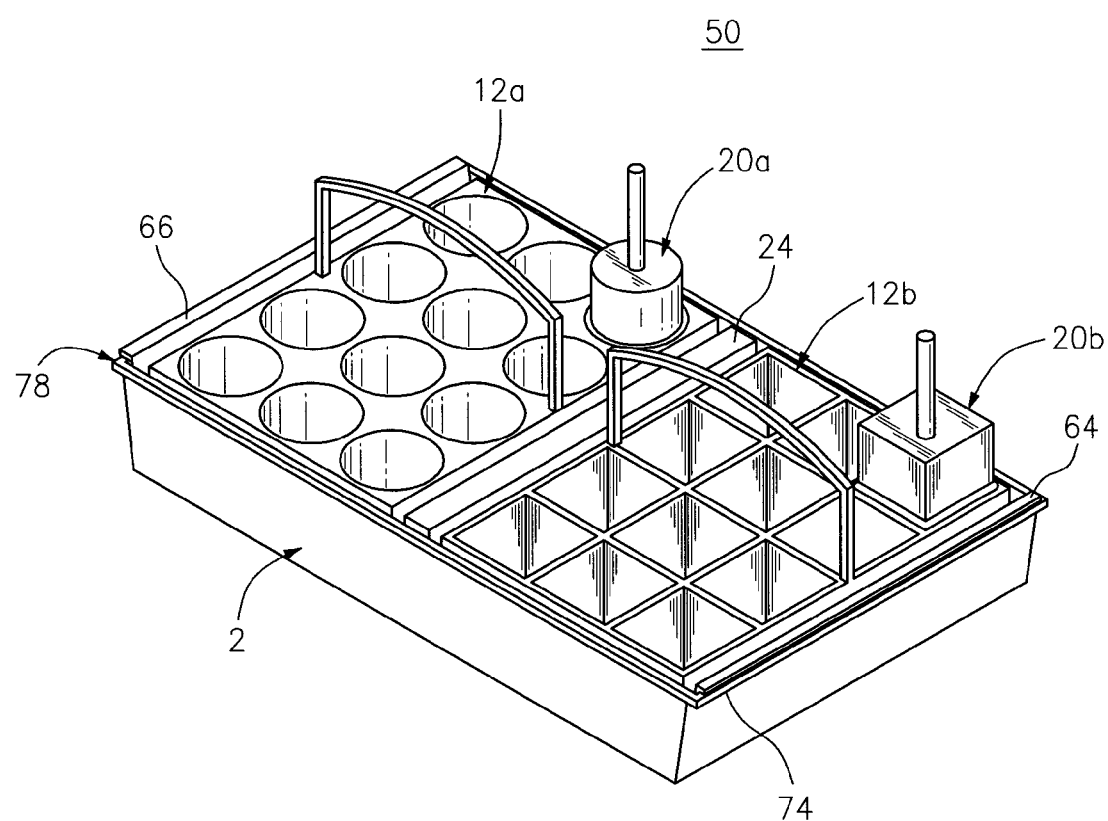
FIG. 1 is a schematic perspective view of a baking pan assembly according to the present invention.
Figure 2:
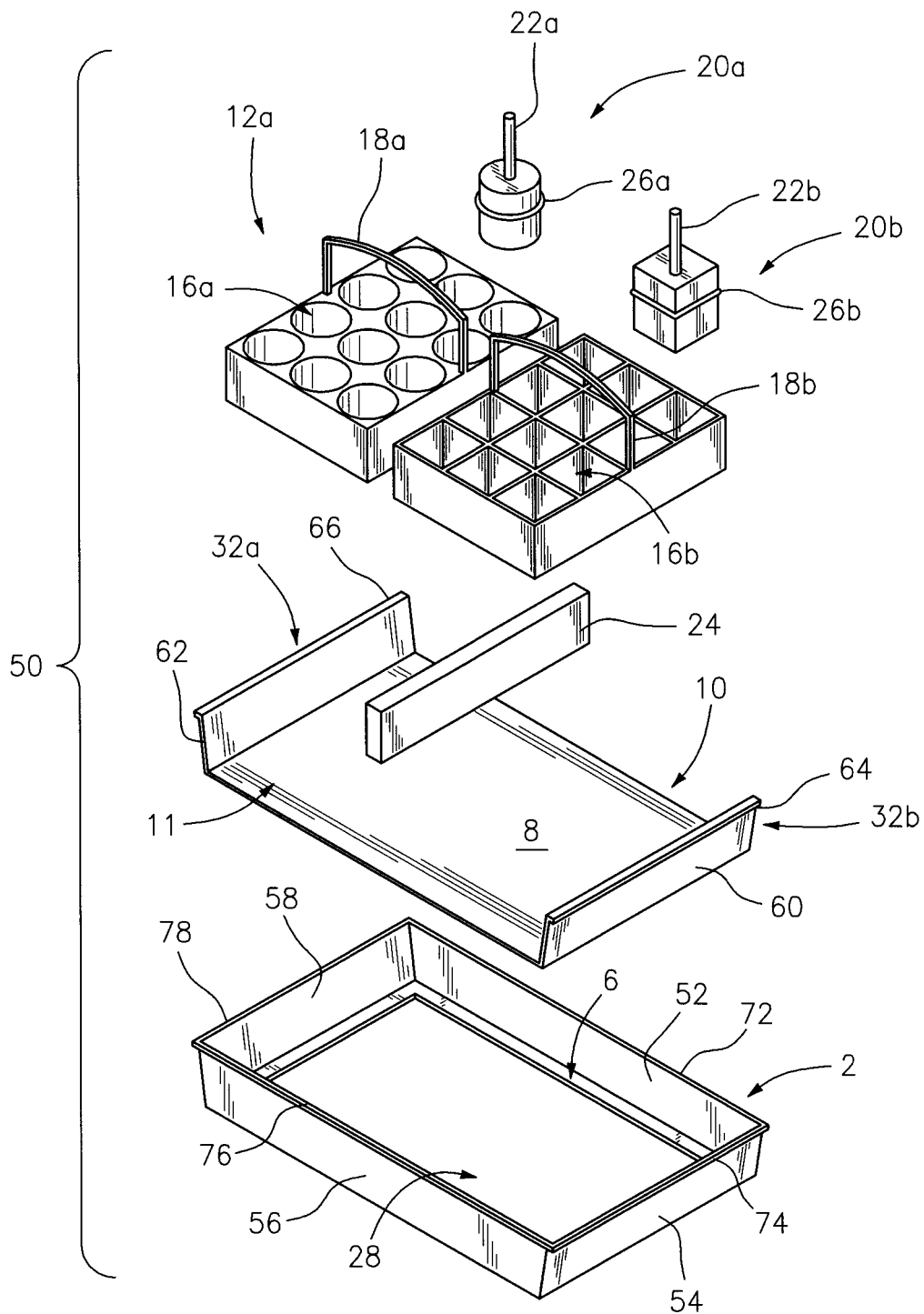
FIG. 2 is an exploded view of the assembly of FIG. 1.

A baking pan assembly 50 according to one construction of the present invention is shown in FIGS. 1 and 2 having a rectangular frame 2, a removable bottom sheet 8, and divider arrays 12*a* and 12*b*. The shape and size of frame 2 can be selected to accommodate the goods which a person desires to bake. The rectangular shape shown in FIGS. 1 and 2 supports, for example, various cookies, brownies, sheet cakes and the like. In other constructions, frame 2 has other shapes such as triangular, circular, oval, or an irregular shape to support cakes, dessert bars, pies and breads of standard or custom shapes. In some constructions, frame 2 has a length ranging from about 6 inches to about 20 inches, more preferably about 9 inches to about 13 inches, a similar range of widths, and a height ranging from about ¼ inch to about 4 inches, more preferably about 2 inches. For a circular frame, the diameter typically ranges from about 4 inches to about 20 inches, more preferably about 6 inches to about 10 inches. Other sizes may be desired for commercial or industrial baking ovens.

As illustrated in FIG. 2, frame 2 has four sidewalls 52, 54, 56 and 58 with outwardly-projecting rims 72, 74, 76 and 78, respectively, in this construction. Frame 2 includes a lower lip 6 which defines and completely borders bottom opening 28. Sheet 8 is sized to fit within frame 2 and rest upon lower, inwardly-projecting lip 6 to serve as a removable bottom for frame 2. Sheet 8 has at least one open side, with open sides 10 and 11 in this construction. Sides 60, 62 establish lifter elements 32a, 32b with flanges 64 and 66 that extend outwardly past sides 54 and 58 of frame 2 to rest on rims 74 and 78 and facilitate gripping and holding the baking pan assembly 50. In other constructions, lifter elements are separately produced and attached to at least one of the frame and the bottom sheet in a fixed or movable manner.

The actual shapes of the individual goods are established by compartments or pockets 16a, 16b in divider arrays 12a, 12b, respectively. For example, pockets 16a are defined by substantially cylindrical walls having top and bottom openings utilized as described in more detail below. Pockets 16b are defined by substantially square walls in this construction, also with top and bottom openings for each pocket. Each pocket or compartment serves as a form or a mold for an individual good when the divider array is placed on bottom sheet 8 as shown in FIG. 1. Material to be baked is then poured, pressed or otherwise deposited into that compartment.

A single divider array is sized to fit within a frame in some constructions, such as shown and described below, while two or more divider arrays are placed within a single frame in other constructions such as shown in FIGS. 1 and 2. One or more spacers 24, also made of a heat-resistant composition including metal, glass and/or ceramic, may be inserted between multiple divider arrays to minimize slippage of the divider arrays within a frame before baking material, especially a batter or other liquid, solidifies.

A plurality of tamps 20a and 20b are included in this construction having handles 22a and 22b, FIG. 2, to assist manipulation relative to compartments 16a and 16b, respectively, to position baking material within the respective compartments. Each tamp is sized to match the cross-sectional area of at least one compartment to press upon dough or other baking material in that compartment. The bottom surface of tamp 20a is round while the bottom surface of tamp 20b is square in this construction. When handles 18a, 18b are movable or removable, a tamp array may be utilized to contact baking material within multiple compartments simultaneously. One or more tamps may have a pattern on a bottom surface, especially for imprinting decorative designs on cookies. Stop ribs 26a, 26b are provided in this construction to limit insertion of tamps 20a, 20b into respective compartments. In other constructions, stop ribs are omitted so that tamps may be inserted deeper into compartments after baking if a good adheres to a wall of a compartment.

In some constructions, at least the frame and sheet are made of a durable, light-weight and easy-to-clean material. Suitable construction materials include steel, aluminium, cast iron, glass, ceramic, porcelain, clad metal or any combination thereof as long as it is suitable for placement and baking within an oven. Suitable aluminium is commercially available from various vendors including Handi-foil Corporation of Wheeling, Ill., for example. Components of the baking pan assembly preferably are coated, at least where contact is likely with goods to be baked, with one or more non-stick compositions such as TEFLON polytetrafluoroethylene, also known as PTFE. Tamps and other accessories are made of polymeric materials in some constructions, such a plastic material available from Sonolite Plastics Corporation of Gloucester, Mass.

Other constructions of a baking pan assembly according to the present invention include at least one multi-function handle. Baking pan assembly 100, FIGS. 3-5, has multi-function handles 102 and 104 pivotally connected to frame 106 as described in more detail below relative to FIGS. 5 and 6. Also illustrated is a round divider array 110, FIG. 3, for molding circular baked goods BG in compartments 112, together with removable bottom sheet 114 (not visible). Bend portions 120, 122 and 124, 126 of handles 102, 104, respectively, preferably clamp on portions of the upper surface of divider array 110, especially when a lifting force is applied grip portions 130, 132 of handles 102, 104.

Figure 3:
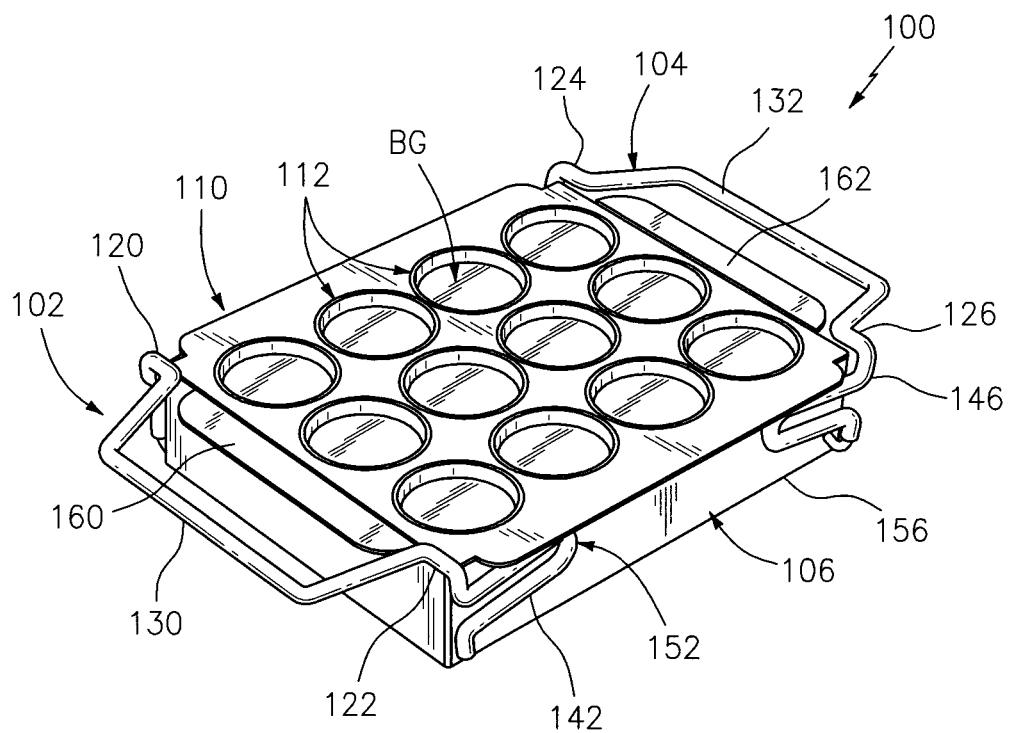
FIG. 3 is a schematic view of another baking pan assembly according to the present invention having multi-function handles and a round divider array for molding circular baked goods.
Figure 4:
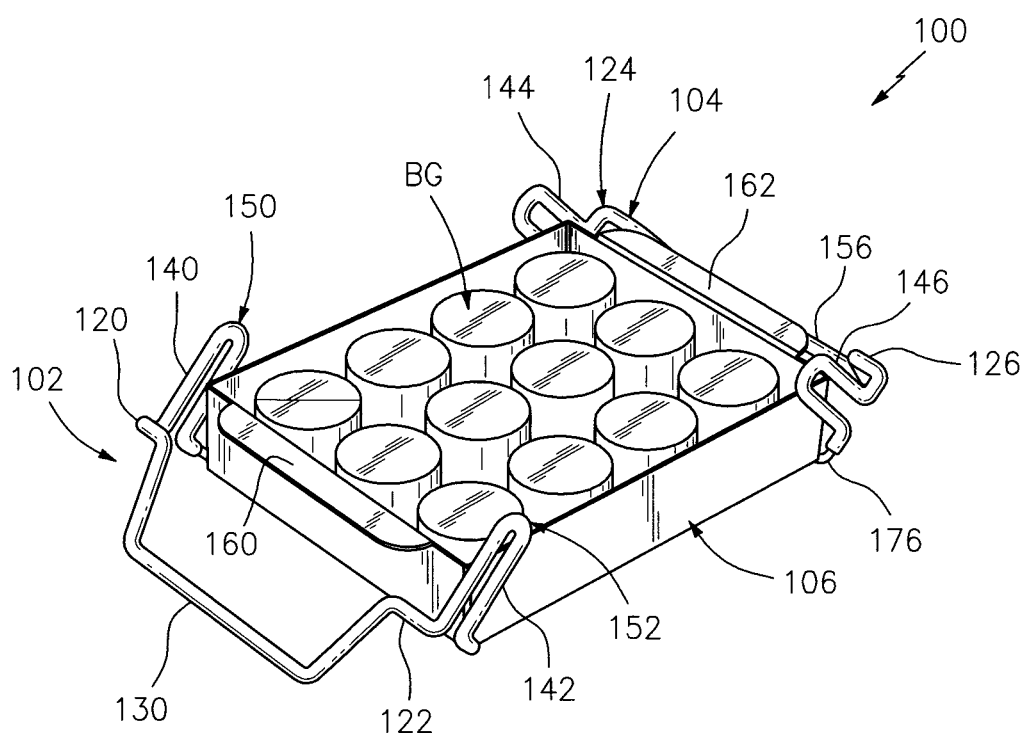
FIG. 4 is a view similar to FIG. 3 after the handles have lifted the divider array for easy removal.
Figure 5:
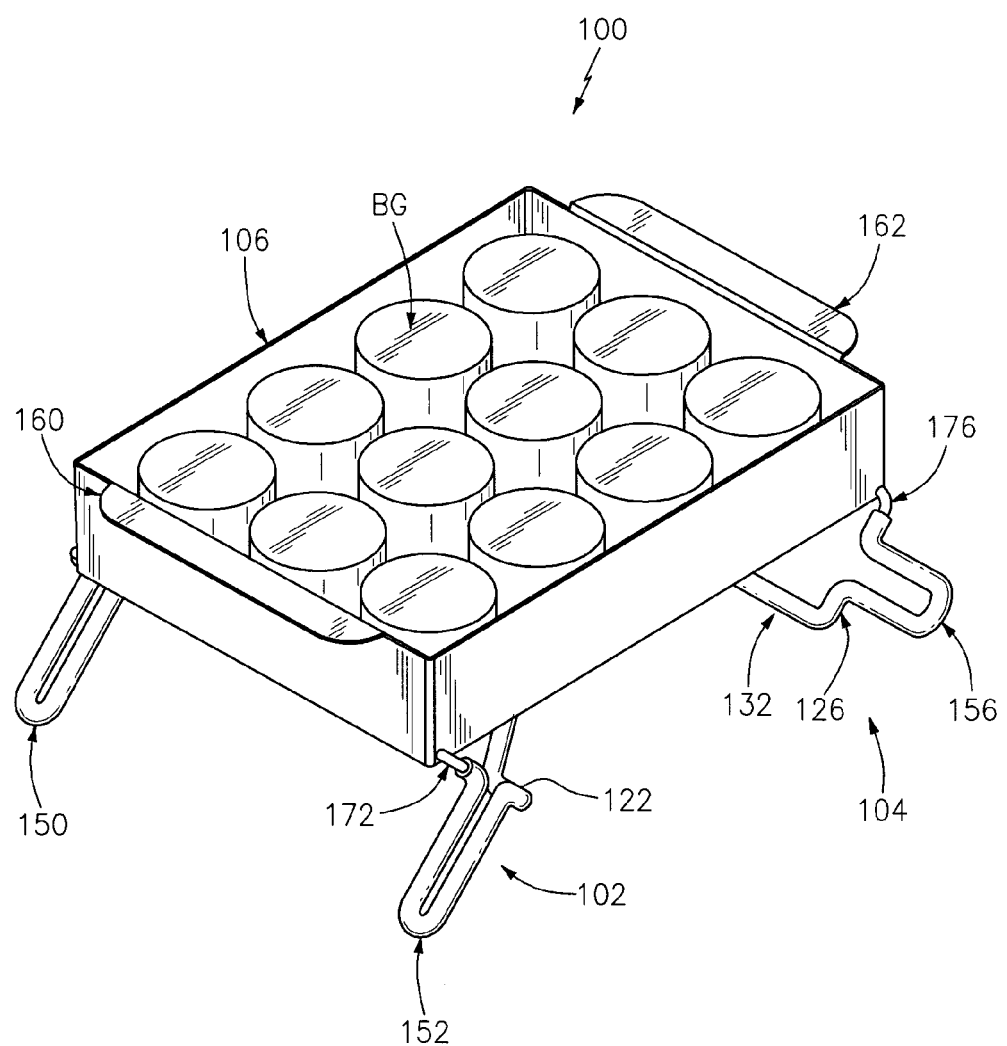
FIG. 5 is a view similar to FIG. 4 with the handles further rotated to serve as a stand.

Flanges 160 and 162 project outwardly from frame 106 in this construction, as illustrated in FIGS. 3-5. Baking pan assembly 100 can be lifted and carried by either flanges 160, 162 or by the grip portions 130, 132 of handles 102, 104.

FIG. 4 is a view similar to FIG. 3 after fulcrum surfaces 140, 142 and 144, 146 of the handles 102, 104 have lifted the divider array 110, relative to frame 106, for easy removal of the divider array 110 by a user.

FIG. 5 is a view similar to FIG. 4 with the handles further rotated to serve as a stand. Grip portions 130 and 132 of handles 102 and 104, together with elbow portions 150, 152 and 154, 156, also serve as stand surfaces upon which handles 102, 104 rest when rotated beneath frame 106. Pivot posts 172 and 176 of handles 102 and 104 are visible pivotally engaging lower portions of frame 106. While most of the outer surfaces of handles 102 and 104 preferably are coated with a temperature-resistant, high-friction material, the terminal ends of handles 102 and 104 are uncoated to better serve as pivot posts.

Figure 6:
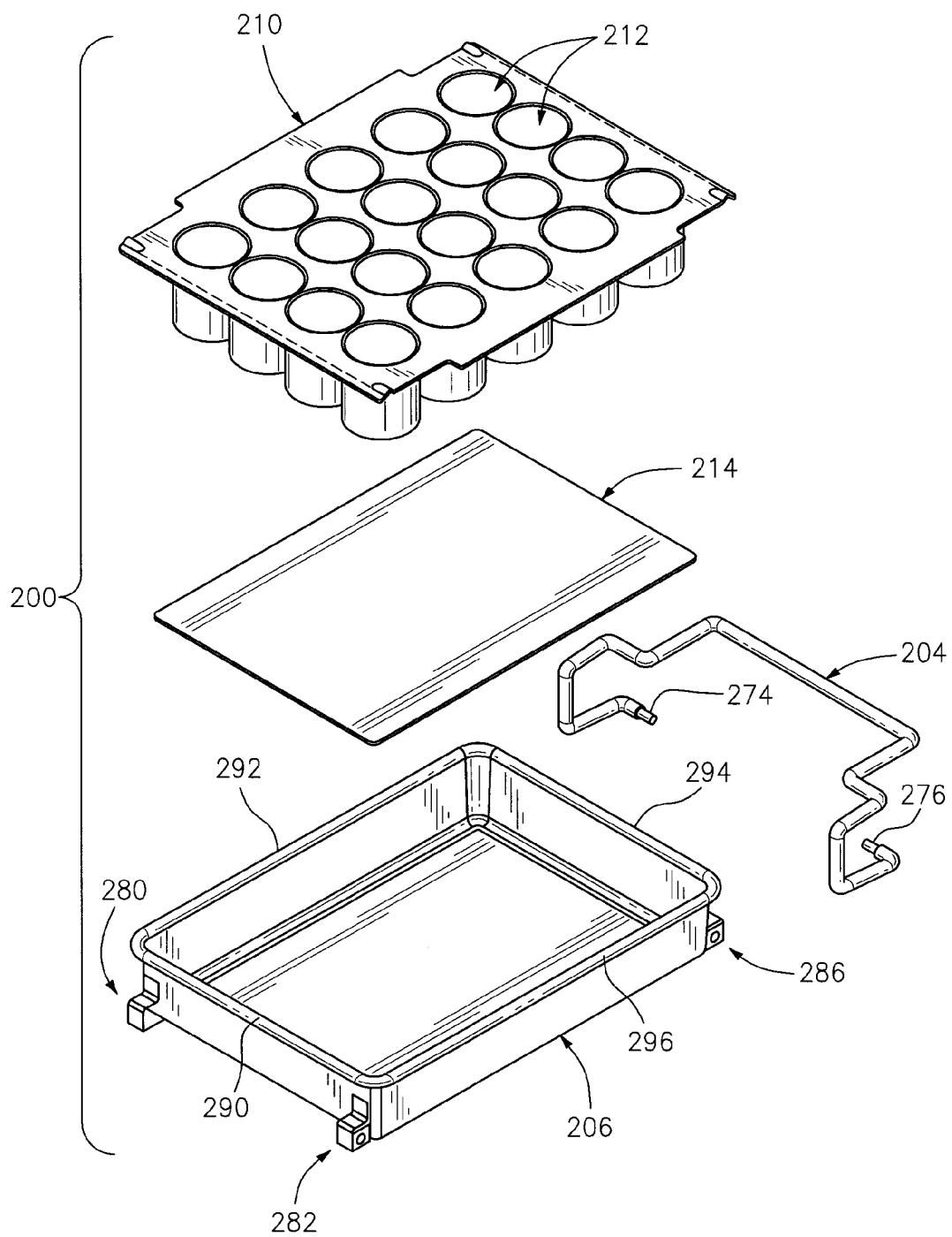
FIG. 6 is an exploded view of a baking pan assembly similar to that of FIGS. 3-5.

FIG. 6 is an exploded view of a baking pan assembly 200, shown assembled in FIG. 7 before baking material is added, which is similar to baking pan assembly 100, FIGS. 3-5. Assembly 200 has multi-function handles 202 and 204 pivotally connected to frame 206 at welded metal socket pieces 280, 282, 284 (not visible) and 286. Each socket 280, 282, 284 and 286 defines a hole which is sized to receive corresponding pivot posts on the handles, such as uncoated posts 274 and 276 of handle 204, shown in enlarged view in FIG. 8. A round divider array 210, FIGS. 6-7, defines compartments 212 for molding circular baked goods, together with removable bottom sheet 214 (not visible in FIG. 7 unless one had a top view through open compartments 212). Bend portions 220, 222 and 224, 226 of handles 202, 204, respectively, preferably clamp on portions of the upper surface of divider array 210, especially when a lifting force is applied to grip portions 230, 232 of handles 202 and 204.

Instead of projecting flanges, the frame 206 has rims 290, 292, 294 and 296 which form a continuous ridge projecting outwardly from frame 106 in this construction, as best illustrated in FIG. 6. Baking pan assembly 200 can be lifted and carried by the grip portions 230, 232 of handles 202, 204. Fulcrum surfaces 240, 242 and 244, 246 of the handles 202, 204 are capable of lifting the divider array 210, relative to frame 206, for easy removal of the divider array 210 by a user. Handle 204 is shown in an enlarged view in FIG. 8. The handles 202 and 204, together with elbow portions 250, 252 and 254, 256, also serve as stand surfaces upon which handles 202, 204 rest when rotated beneath frame 206.

Figure 9:
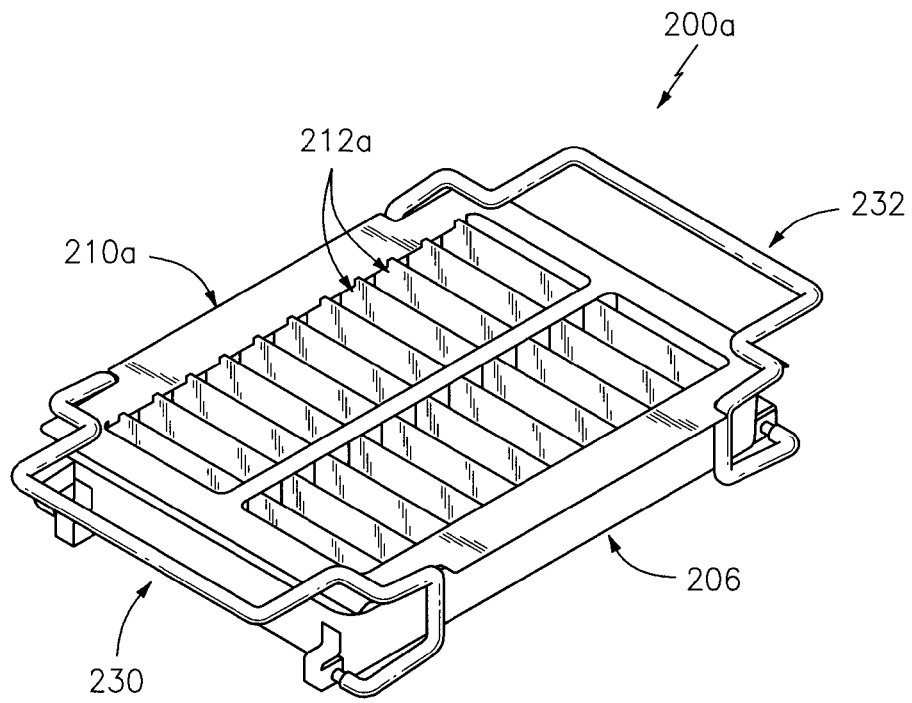
FIG. 9 is a view similar to FIG. 7 with a rectangular divider array.
Figure 10:
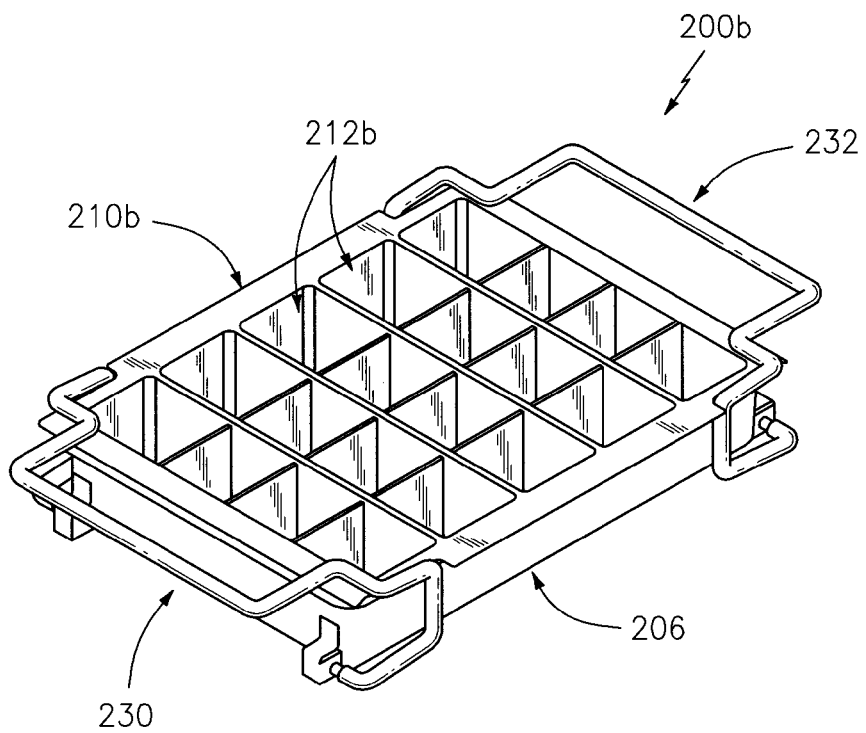
FIG. 10 is a view similar to FIG. 7 with a square divider array.

FIG. 9 is a view similar to FIG. 7 with a rectangular divider array 210a having elongated rectangular compartments 212a. FIG. 10 is a view similar to FIG. 7 with a square divider array 210b defining square compartments 212b.

Although specific features of the present invention are shown in some drawings and not in others, this is for convenience only, as each feature may be combined with any or all of the other features in accordance with the invention. While there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature.

It is the intention, therefore, to be limited only as indicated by the scope of the claims appended hereto. Other embodiments will occur to those skilled in the art and are within the following claims.

What is claimed is:

1. A baking pan assembly, comprising:
   a frame with at least four contiguous walls defining an upper opening and a lower opening, and having a lip substantially bordering the lower opening;
   at least one removable sheet sized to rest upon the lip to block the lower opening of the frame;
   at least a first divider array sized to rest on the sheet within the frame, the array defining a plurality of compartments to receive goods to be baked, each compartment having at least one wall defining an upper opening and a lower opening; and
   at least two multi-function handles pivotally connected to opposing sides of the frame;
   wherein the divider array includes portions having an upper surface and a lower surface projecting outwardly beyond the upper opening of the frame, and wherein each of the at least two multi-function handles includes at least one fulcrum surface capable of engaging at least one respective portion of the lower surface of the divider array to raise the divider array away from the frame;
   wherein each of the at least two multi-function handles further includes a least one stand surface upon which the handle rests when the handle is rotated beneath the frame.

2. The assembly of claim 1 wherein at least one of the frame, the sheet and the divider array includes a non-stick coating.

3. The assembly of claim 1 wherein the at least one wall of each compartment is substantially vertical to facilitate separation from a good baked in that compartment when the divider array is lifted away from the sheet.

4. The assembly of claim 1 wherein each of the at least two multi-function handles further includes at least one bend portion capable of clamping on a portion of the upper surface of the divider array to secure the divider array to the frame.

5. The assembly of claim 1 further including at least a second separate, independent divider array, wherein the plurality of compartments in the first divider array differ from the plurality of compartments in the second array.

6. The assembly of claim 1 further including at least one tamp, each tamp sized to match the cross-sectional area of at least one compartment to press upon material in that compartment.

7. A method of baking goods, comprising:
   selecting a baking pan assembly including a frame with at least four contiguous walls defining an upper opening and a lower opening, and having a lip substantially bordering the lower opening;
   placing at least one removable sheet, sized to block the lower opening of the frame, into the frame to rest upon the lip to form a baking pan;
   selecting at least a first divider array sized to rest on the sheet within the frame, the array defining a plurality of compartments to receive goods to be baked,
   placing at least the first divider array onto the sheet within the frame and adding material to be baked into at least one of the compartments; and
   heating the assembly to bake the goods;
   wherein the frame includes at least two multi-function handles pivotally connected to opposing sides of the frame, the first divider array includes portions having an upper surface and a lower surface projecting outwardly beyond the upper opening of the frame, and wherein each of the at least two multi-function handles includes at least one fulcrum surface capable of engaging at least one respective portion of the lower surface of the divider array to raise the divider array away from the frame, and the method further including rotating the handles in a first direction to at least partially separate the divider from the sheet.

8. The method of claim 7 wherein each of the at least two multi-function handles further includes a least one stand surface upon which the handle rests when the handle is rotated beneath the frame.

9. The method of claim 7 wherein the at least one wall of each compartment is substantially vertical to facilitate separation from a good baked in that compartment when the divider array is lifted away from the sheet when the at least two multi-function handles are rotated.

10. The method of claim 7 wherein each of the at least two multi-function handles further includes at least one bend portion capable of clamping on a portion of the upper surface of the divider array to secure the divider array to the frame, and the step of placing the at least one divider array onto the sheet within the frame further includes rotating the handles in a second direction to clamp the divider array to the frame.

11. The method of claim 7 further including pressing upon material in at least one compartment with a tamp sized to match the cross-sectional area of that compartment.

* * * * *